United States Patent [19]
David et al.

[11] Patent Number: 5,178,426
[45] Date of Patent: Jan. 12, 1993

[54] DISPOSABLE COMBINATION PAD AND BAG DEVICE FOR PETS EXCREMENTS

[76] Inventors: George David; Rose H. David, both of 1822 Andoa La., Mt. Prospect, Ill. 60056

[21] Appl. No.: 815,699

[22] Filed: Dec. 31, 1991

[51] Int. Cl.⁵ .............................................. A01K 29/00
[52] U.S. Cl. .................................... 294/1.3; 294/1.1; 294/152; 119/161
[58] Field of Search .................... 294/1.1, 1.3, 1.5, 74, 294/141, 149, 141, 152, 156; 119/161, 165; 56/329

[56] References Cited

U.S. PATENT DOCUMENTS

| | | | |
|---|---|---|---|
| 732,838 | 7/1903 | Edwards | 294/152 |
| 1,938,478 | 12/1933 | Bailer | 294/152 X |
| 2,749,957 | 6/1956 | Smith | 294/1.1 X |
| 2,974,971 | 3/1961 | Buck | 294/1.1 X |
| 3,626,900 | 12/1971 | Failla | 119/161 |
| 3,792,806 | 2/1974 | Layton | 294/152 |
| 4,156,400 | 5/1979 | Migdal | 294/1.3 X |
| 4,500,129 | 2/1985 | Hahn | 294/141 X |
| 4,723,327 | 2/1988 | Smith | 294/74 X |
| 4,738,477 | 4/1988 | Grossmeyer | 294/1.1 |
| 4,800,677 | 1/1989 | Mack | 294/1.3 X |
| 4,881,684 | 11/1989 | Chinman | 294/152 X |
| 4,902,283 | 2/1990 | Rojko et al. | 294/1.3 X |

FOREIGN PATENT DOCUMENTS 2562384 10/1985 France .................................. 294/1.3

Primary Examiner—Charles A. Marmor
Assistant Examiner—Dean J. Kramer
Attorney, Agent, or Firm—Charles F. Lind

[57] ABSTRACT

The disclosed disposable pad device has a generally symmetrical shape with spaced corners and connecting peripherial edges, defining a broad area suited to be laid out flat on the ground with a peripheral edges outermost. Narrow elongated generally stiff reinforcing strips are secured along their lengths to the pad and respectively extend generally inboardly from the pad corners toward the pad interior region to be spaced apart only slightly at their inboard ends, thereby defining a small nonreinforced interior pad region that can be folded easily over and around any pet excrements on the pad when forming the carrying bag. Flexible handles are connected off of the reinforcing strips and extended outboardly beyond the peripheral pad edges at the corners, and have inside openings sized for finger hooking by the person walking the pet, for suspended carriage of the pad when formed to the carrying bag.

4 Claims, 3 Drawing Sheets

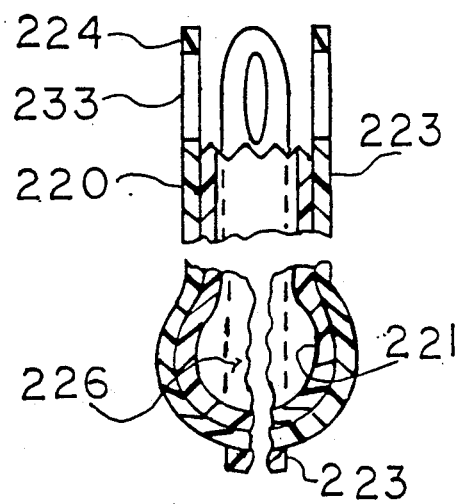
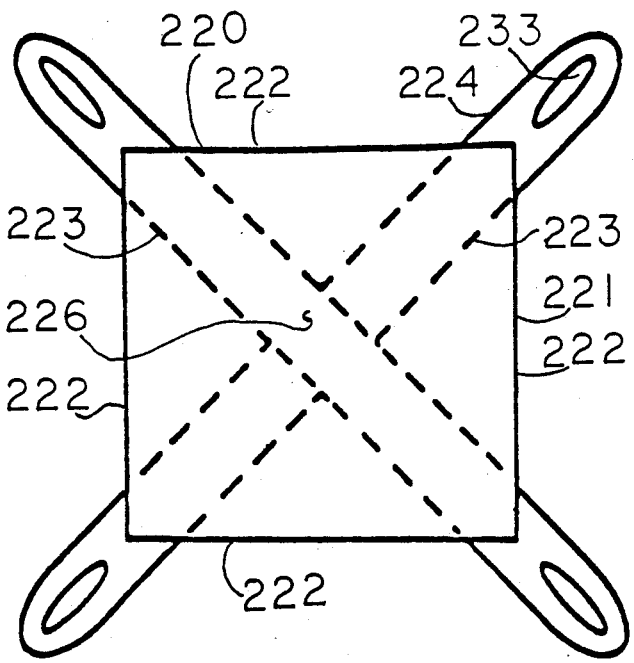
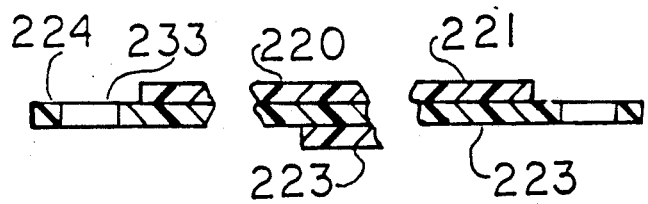
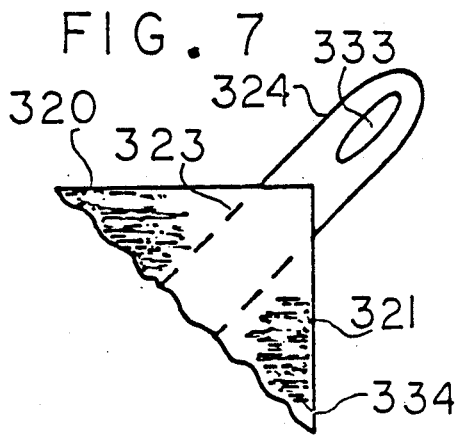
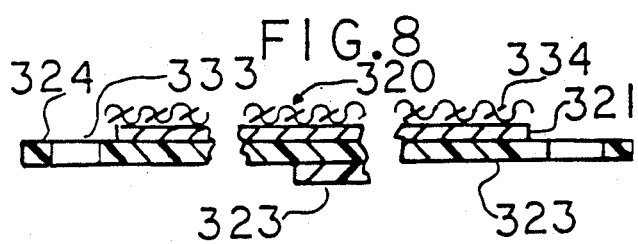

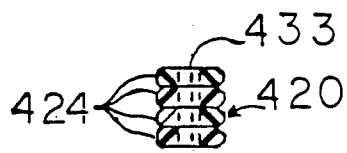
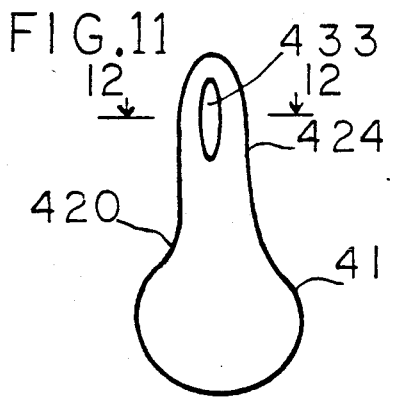
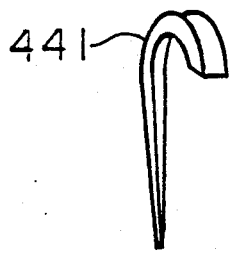
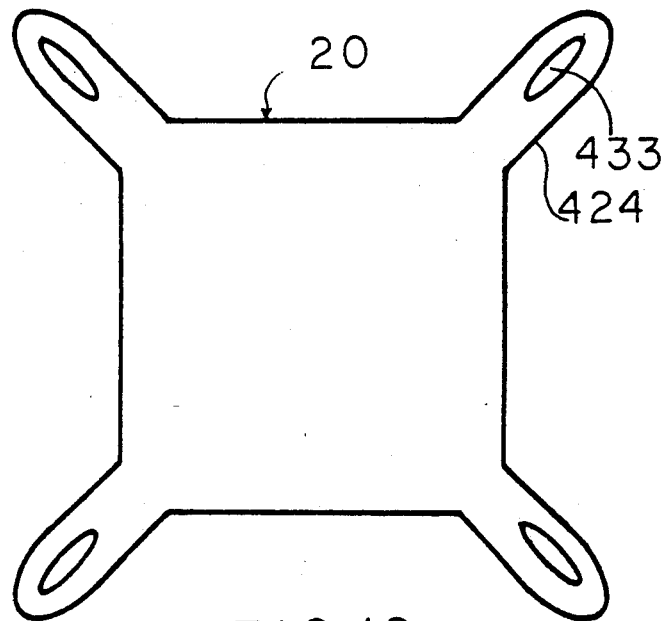
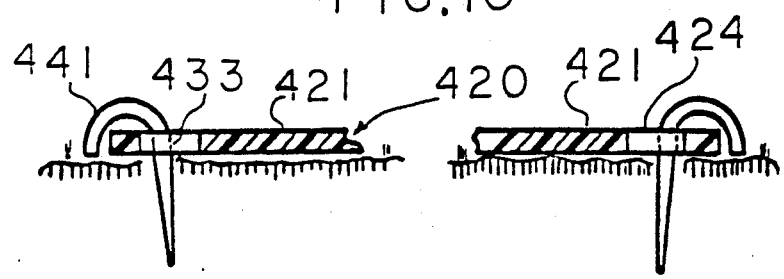

DISPOSABLE COMBINATION PAD AND BAG DEVICE FOR PETS EXCREMENTS

BACKGROUND OF INVENTION

It is common for a dog owner to walk the animal for the purpose of allowing it to answer natures call. However, many local ordinances provide for criminal fines against any pet owner who leaves the excrements in place; whereby complying pet owners may use known means including shovel or dust pan and broom devices, napkins, or gloves for picking up and removing the excrements left by the pet. Some of the above procedures would seem to be psychologically stressful, in having to touch the fresh excrements. Nonetheless, all of these known common prior means or procedures relate to picking up and removing the droppings after such have been deposited on the site. Thus even though much or even most of the excrements may be removed, some residue is left behind on the site. Worse, of course, are noncomplying pet owners who leave all of the refuse behind on the site.

SUMMARY OF INVENTION

This invention provides a disposable combination pad and bag device for collecting and disposing of pet excrement from sites including private and public property, parks or the like.

The device as a pad is configured flat to have the owner lay it on the ground to provide a broad target collection area on which the pet overlies to initially discharge the excrements, and handles on the pad periphery then allow the pet owner to lift up the pad to convert it to a bag for holding the excrements which the pet owner can then carry to a proper refuse disposal site, for effectively, environmentally and sanitarily disposing of the device and the contained excrements therein.

In using this invention, the pet owners would train his/her pet to discharge its excrements at a controlled location on the pad laid flat on the ground, and after the pet has complied, the owner need then merely gather the handles together for converting the pad into a bag for carrying the pet excrements to a proper refuse container.

BRIEF DESCRIPTION OF THE DRAWINGS

The features and advantages of the present invention will become more apparent from the following detailed description, including as a part thereof the accompanying drawings, wherein:

FIGS. 4, 5 and 6 are views similar to FIGS. 1, 2, and 3, respectively, except illustrating a second embodiment of our invention;

FIGS. 7 and 8 are views similar to FIGS. 4 and 5 respectively, except illustrating yet a third embodiment of our invention;

FIG. 9, 10 and 11 are views similar to FIGS. 4, 5 and 6 respectively, except illustrating a fourth embodiment of our invention;

FIG. 12 is a cross sectional view illustrating gathered handles of the device, as seen generally from line 12—12 in FIG. 11;

FIG. 13 is a perspective view of a stake used in FIG. 10.

DESCRIPTION OF THE PREFERRED EMBODIMENTS

Figure 3:
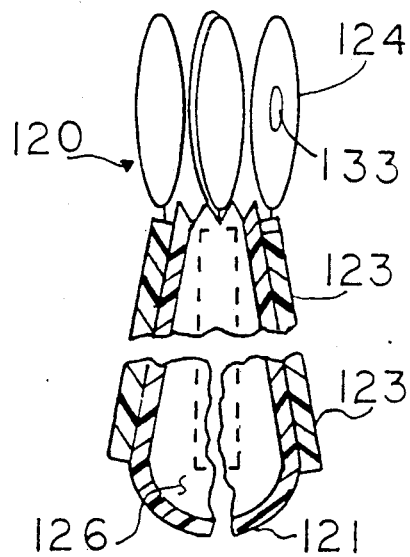
FIG. 3 is partial sectional view similar to FIG. 2, except showing the device folded to form the bag after its excrements collection use.
Figure 1:
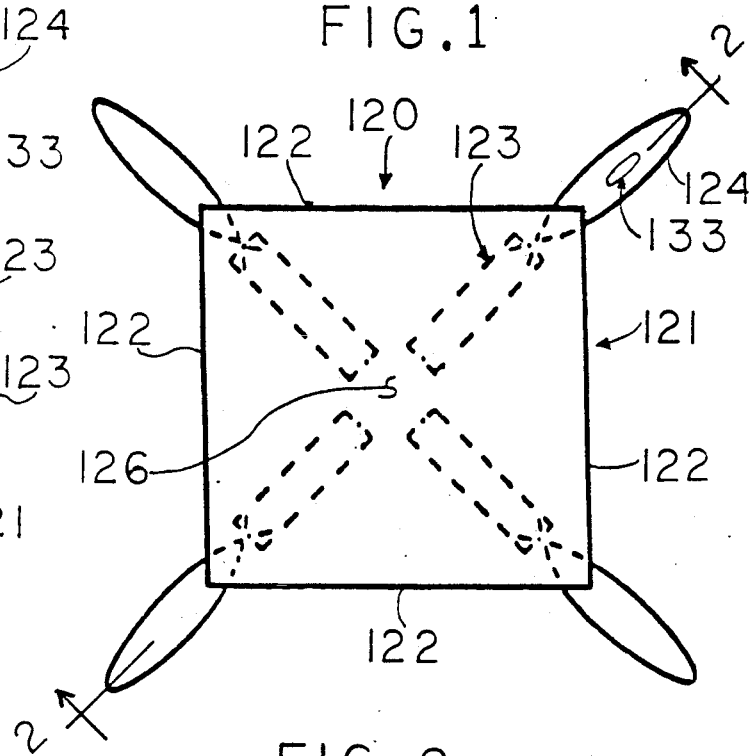
FIG. 1 is a plan view of a first embodiment of our invention.
Figure 2:
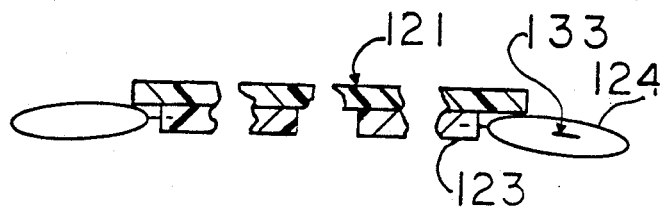
FIG. 2 is an enlarged partial sectional view as seen generally from line 2—2 in FIG. 1.

The disposable combination pad and bag device 120 illustrated in FIGS. 1, 2 and 3 comprises a flexible pad 121 of a broad area suited to be laid out flat on the ground with the peripheral edges 122 outermost. The pad 121 illustrated has a generally symmetrical shape, having four corners. Handles 124 project away from the pad and beyond the pad edges 122 at the corners.

The preferred pad 121 would be square and approximately 10-20 inches along each edge 122. The pad further would be made of a durable flexible material, such as a degradable plastic sheet, of perhaps 1-5 mils thickness.

The pad 121 further would have attached to it four strips 123. The strips 123 can be of a plastic bonded to the sheet each possibly of 1-10 mils and 2 to 2½ inches width and between 5 and 10 inches long. The inbound ends of opposite strips 123, are preferably spaced apart by perhaps 2-8 inches leaving a central pocket of target region 126 without the strips. The handles 124 can be attached to the outboard ends of the strip 123 and can be in the form of looped flexible string defining an inside opening 133. For convenience, handle 124 can be 2-5 inches whereby the opening 133 can receive at one end typically several fingers of the user.

The reinforcing strips 123 would offer strength and added stiffness to the pad 121, which would tend to hold the pad 121 flat when laid out on the ground even in windy conditions that otherwise might blow the device away.

The illustrated device would be used as follows. When the owner walking the dog saw the need for the dog to relieve itself, the owner would spread out or position the pad 121 on the ground at a desired location. When the pad 121 was so positioned on the ground, the pet owner would train the pet to position itself over the pad 121 aiming for the central pocket region 126. When the pet was finished and his excrements laid on the pad 121 the owner would thereupon gathers the handles 124 using the inside finger opening 133 together to lift the entire device 120 off the ground, whereupon the pad would assume a hanging vertically oriented bag configuration shown in FIG. 3, and the excrements would be contained within the pad near the pad center 126.

Two or more of the gathered handles 124 with openings 133 can be tied together to close the bag top, or one can merely grip the handles in carrying the device 120 for proper disposal in a refuse container.

The material of the pad would be of sufficient strength to withstand and hold the weight of the collected excrements and durable enough to withstand any liquid or moisture that may contact the pad. As noted, a flexible plastic sheet would be preferred.

A second embodiment of the disposable combination pad and bag device 220 is illustrated in FIGS. 4, 5, and 6. The pad 221 can be similar to the pad 121 of FIGS. 1-3, however the reinforcing strips 223 would cross one another and extend at their outbound ends past the corners edges 222 of the pad 221 to define handles 224 integrally of strips 223. Each strips 223 can be of a flexible material of a thickness of 1-10 mils and a width of 1-4 inches and a overall length of several inches longer than the diagonal of the pad or perhaps 18-38 inches to provide handles of perhaps 2 to 5 inches each; An opening 233 can be formed in each handle 224 perhaps 1 inch minimum in size, for receiving the users fingers to help carry the bag. The strips 223 would be attached to pad 221 by thermal bonding or adhesive.

FIG. 5 illustrates the reinforcing strips crossing and overlaping one another under the central pocket region 226.

FIG. 6 illustrates the hanging bag carrying configuration of the device 220, whereby the handles 224 allow the ready conversion of the pad to the carrying bag for proper disposal of the collected excrements into a refuse container.

FIG. 7 and 8 illustrate, yet, a third embodiment of the device 320 closely related to the previous embodiments, except a degradable woven fiber or cloth mat 334 is bonded onto the thin flexible degradable plastic pad sheet 321. This cloth fabric 334 is used to absorb the liquid or wet portions of the pet excrements, while the plastic sheet 321 prevents the wetting of the bag exterior. The flexible plastic sheet 321 might be slightly thinner than in the previous embodiments, and the fiber mat 334 might be 1/16-¼ inch thick.

FIG. 8 illustrates the cloth fabric mat 334 and plastic sheet 321, the reinforcing strips 223 and handles 324 being formed internally on the outboard and thereof, including the handles having openings 333 therein.

FIG. 9, 10 and 11 illustrate a fourth embodiment of the device 420, having a single pad 421 with integral handles 424. The device would be formed of a heavier gauge plastic sheet, possibly between 2-15 mils, and the four handles 424 and holes 433, for receiving fingers in griping the closed bag would be at the four corners.

FIG. 10 illustrates the pad laid flat on the ground and a set of hold down stakes 441 fitted through the handle holes and driven into the ground. The stakes 441 can be formed of rigid but degradable plastic or wood, measuring several inches in length along a shank and having a small halfcircle hook at the top end. The stake 441 can thus be fitted through the opening 433 in the handle 424 with the hook overlying the handle 424 and then be driven into the ground. The stake body could of 1/16-¼ inch cross section, tapering to a point on one end to ease the penetration into ground or soil. The stakes 441 could be used on a windy day to hold down and control the pad 421 in its flat stretched out collection condition. The stakes could be removed and reused, or being degradable, could be left behind.

FIG. 11 illustrates the device 420 in a suspended carrying bag configuration, and FIG. 12 shows the handles 424 being twisted to align the finger holes 433, whereby the fingers of the carrying person can be fitted there through for carrying the bag after pet use.

Each of the disposable combination pad and bag device disclosed herein can be folded and stored as a compact package, to be carried in a pocket, purse or hand of the pet owners when walking their pet.

While a 15-18 inch square may be a preferred size, the pad could be made in larger or smaller standard sizes, determined in part to accomodate to the size of the pet.

While the specification refers to the ground for supporting the pad and bag combination, this could be dirt, grass, roadway or the like. It is possible that the device could even find use inside on a floor.

While preferred embodiments of the present invention have been disclosed herein, such have been provided by way of example only. Variations, changes and substitutions might occur to those skilled in the art without departing from the invention herein. Accordingly, it is intended that the invention be limited only by the scope of the appended claims.

What we claim is:

1. A disposable combination pad and bag device for pet excrements, comprising a pad of a symmetrical generally square shape having four spaced corners and connecting peripherial edges, defining a broad interior area suited to be laid out flat on the ground with the peripherial pad edges outermost;

four narrow elongated separate generally stiff reinforcing strips secured along their lengths to the pad and respectively extended generally inboardly from the pad corners toward the pad interior region to provide the opposite respective strips aligned and spaced apart only slightly at their inboard ends, thereby defining a small nonreinforced interior pad region that can be folded easily over and around any pet excrements on the pad when forming the carrying bag;

a plurality of flexible handles connected at their inboard ends to the outboard ends of the reinforcing strips and extended outboardly beyond the peripherial pad edges at the corners thereof, and each handle having outboardly beyond the peripherial pad edges an inside opening sized for finger hooking by the person walking the pet, for easily handling the pad when formed to the carrying bag; and said pad being formed of generally durable, flexible and moisture resistant sheet material sufficient to physically support and hold any pet excrements on the pad as it is folded up and around the same and is suspended from the handles as a bag, for disposal elsewhere.

2. A disposable pad and bag combination according to claim 1, wherein each peripheral edge is of the order between 10-20 inches long, and the reinforcing strips are spaced apart at their inboard ends between approximately 2-8 inches.

3. A disposable pad and bag combination according to claim 2, wherein the flexible handles extend outwardly beyond the peripherial pad edges at the corners thereof distances of the order of 2-5 inches.

4. A disposable pad and bag combination according to claim 3, wherein the inside opening in each handle is at least 1 inch across.

* * * * *